United States Patent
Kurtz et al.

(10) Patent No.: US 10,030,575 B2
(45) Date of Patent: Jul. 24, 2018

(54) SYSTEM AND METHOD FOR FLOWING A MIXTURE OF COOLANTS TO A CHARGE AIR COOLER

(71) Applicant: Ford Global Technologies, LLC, Dearborn, MI (US)

(72) Inventors: Eric Matthew Kurtz, Dearborn, MI (US); Paul Joseph Tennison, West Bloomfield, MI (US); Daniel Joseph Styles, Canton, MI (US); Curtis Michael Bauer, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 14/795,220

(22) Filed: Jul. 9, 2015

(65) Prior Publication Data

US 2017/0009642 A1     Jan. 12, 2017

(51) Int. Cl.
| | |
|---|---|
| F02B 29/04 | (2006.01) |
| F02D 41/00 | (2006.01) |
| F02M 35/10 | (2006.01) |
| F02M 26/06 | (2016.01) |

(52) U.S. Cl.
CPC ...... F02B 29/0493 (2013.01); F02B 29/0443 (2013.01); F02B 29/0462 (2013.01); F02D 41/0007 (2013.01); F02M 35/10157 (2013.01); *F02M 26/06* (2016.02); *Y02T 10/144* (2013.01); *Y02T 10/146* (2013.01)

(58) Field of Classification Search
CPC ............... F02B 29/04–29/0493; Y02T 10/144
See application file for complete search history.

(56) References Cited

U.S. PATENT DOCUMENTS

| | | | |
|---|---|---|---|
| 6,101,987 A | 8/2000 | Saur et al. | |
| 6,230,668 B1 | 5/2001 | Marsh et al. | |
| 7,380,544 B2 | 6/2008 | Raduenz et al. | |
| 2004/0074471 A1* | 4/2004 | Watanabe | F02D 41/0007 123/305 |
| 2005/0034712 A1* | 2/2005 | Guerrero | F02B 29/0412 123/540 |
| 2006/0117748 A1* | 6/2006 | Bundschuh | F01P 7/165 60/599 |
| 2008/0163855 A1* | 7/2008 | Matthews | F01N 13/009 123/568.12 |
| 2008/0276913 A1* | 11/2008 | Zubeck | B60K 6/442 123/543 |
| 2009/0020079 A1* | 1/2009 | Muller | F01P 7/165 123/41.1 |

(Continued)

FOREIGN PATENT DOCUMENTS

| | | | | |
|---|---|---|---|---|
| EP | 2513449 B1 * | 2/2014 | | F02B 29/0412 |
| WO | 2007040987 A1 | 4/2007 | | |

*Primary Examiner* — Laert Dounis
(74) *Attorney, Agent, or Firm* — Julia Voutyras; McCoy Russell LLP

(57) ABSTRACT

Methods and systems are provided for flowing a first coolant and a second coolant to a charge air cooler. In one example, a method may include flowing only a first coolant, flowing only a second coolant, or flowing a mixture of the first and the second coolants to the charge air cooler based on engine operating conditions. Further, the method may include adjusting additional engine operating parameters based on a ratio of the first coolant to second coolant flowing to the charge air cooler.

18 Claims, 7 Drawing Sheets

(56) References Cited

U.S. PATENT DOCUMENTS

2014/0120820 A1* 5/2014 Glugla ............... F02B 29/0493
454/75
2014/0245735 A1 9/2014 Kuske et al.

* cited by examiner

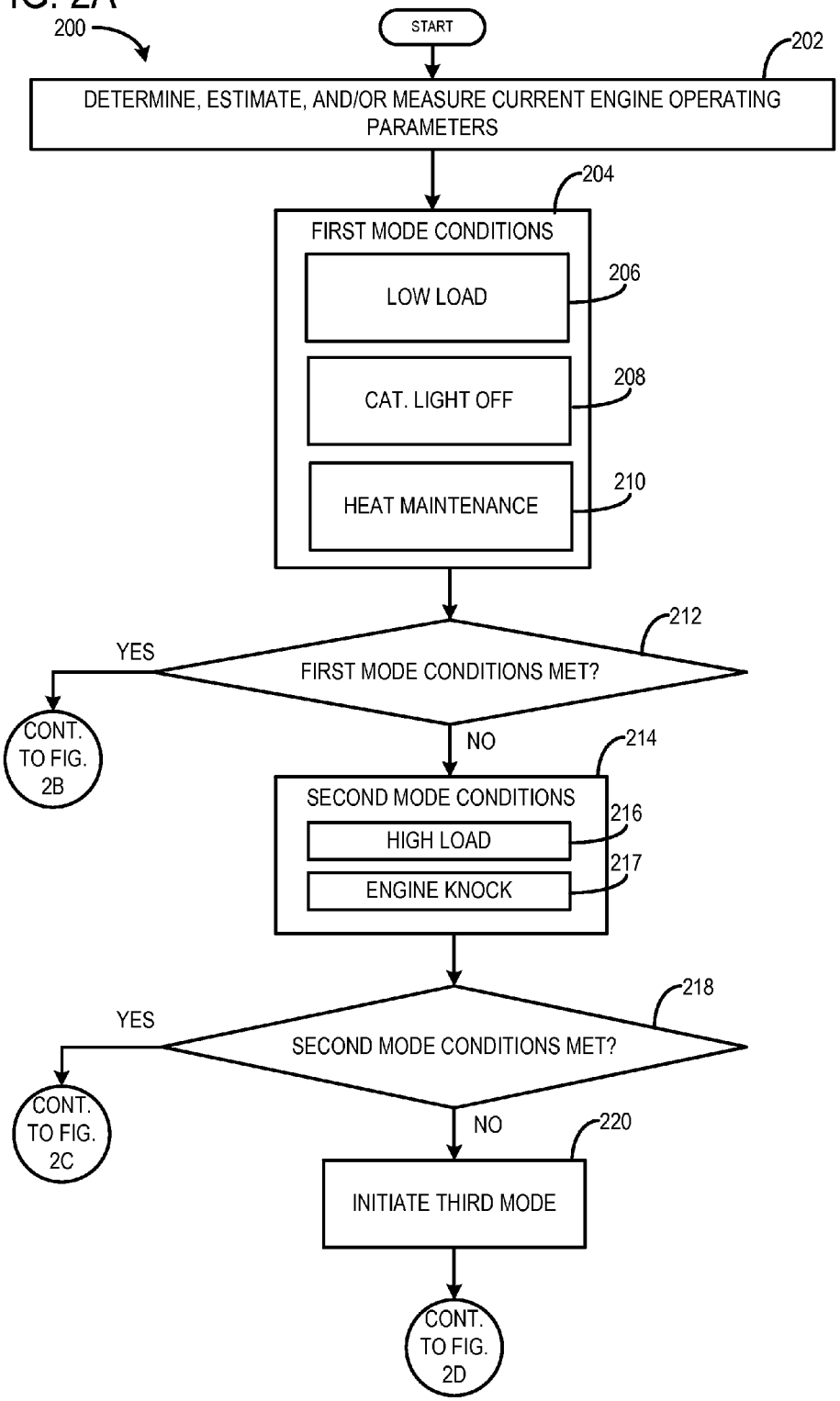

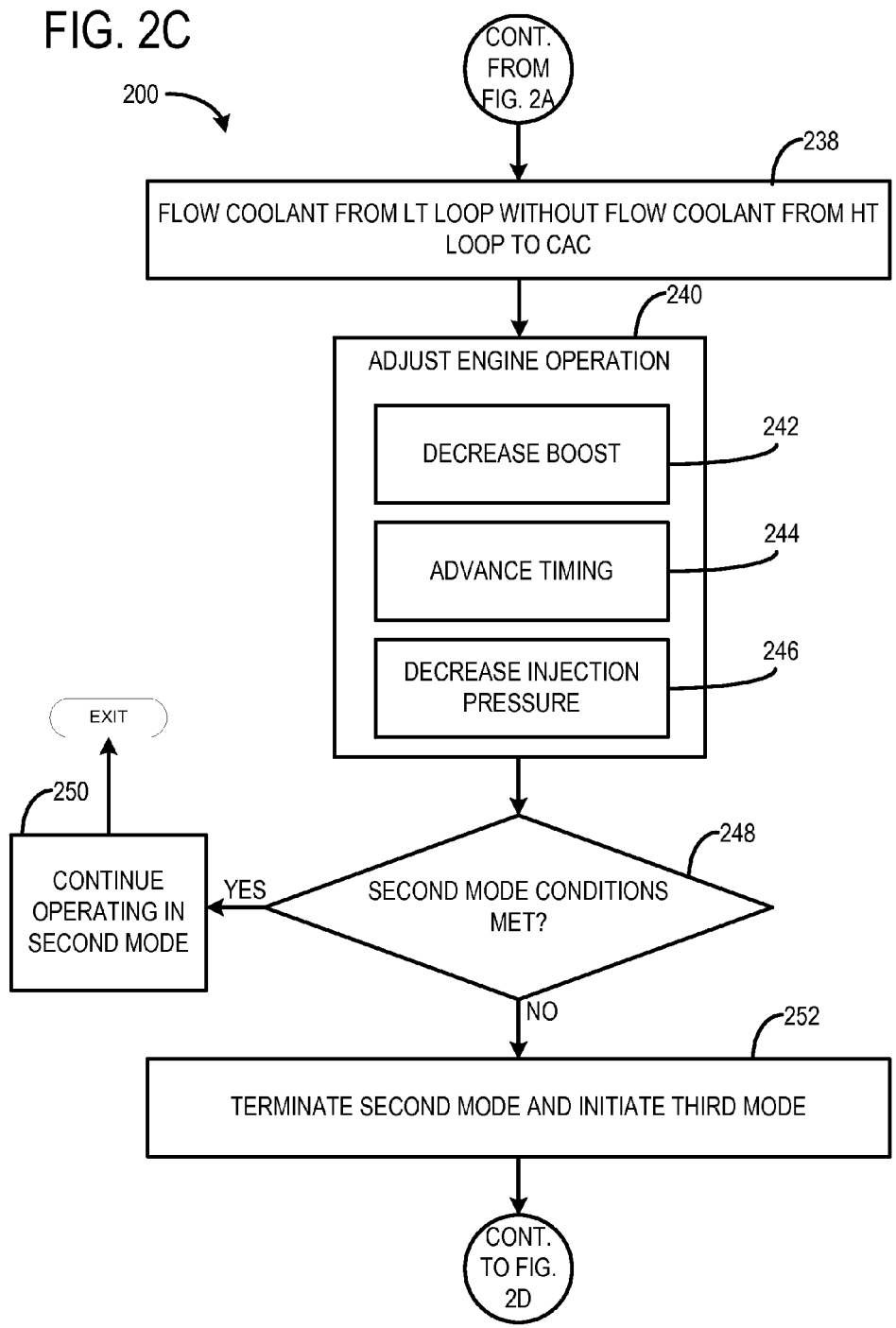

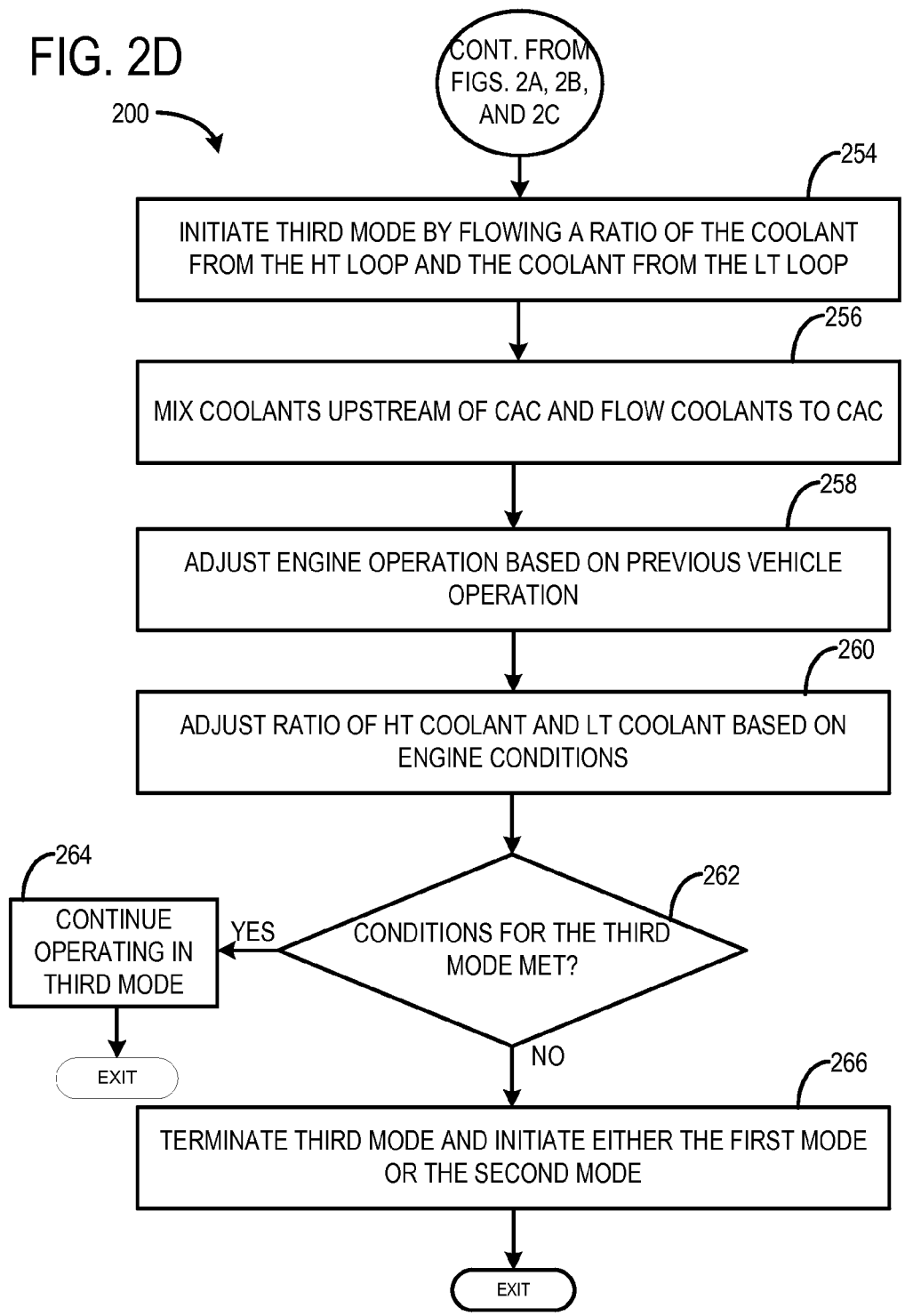

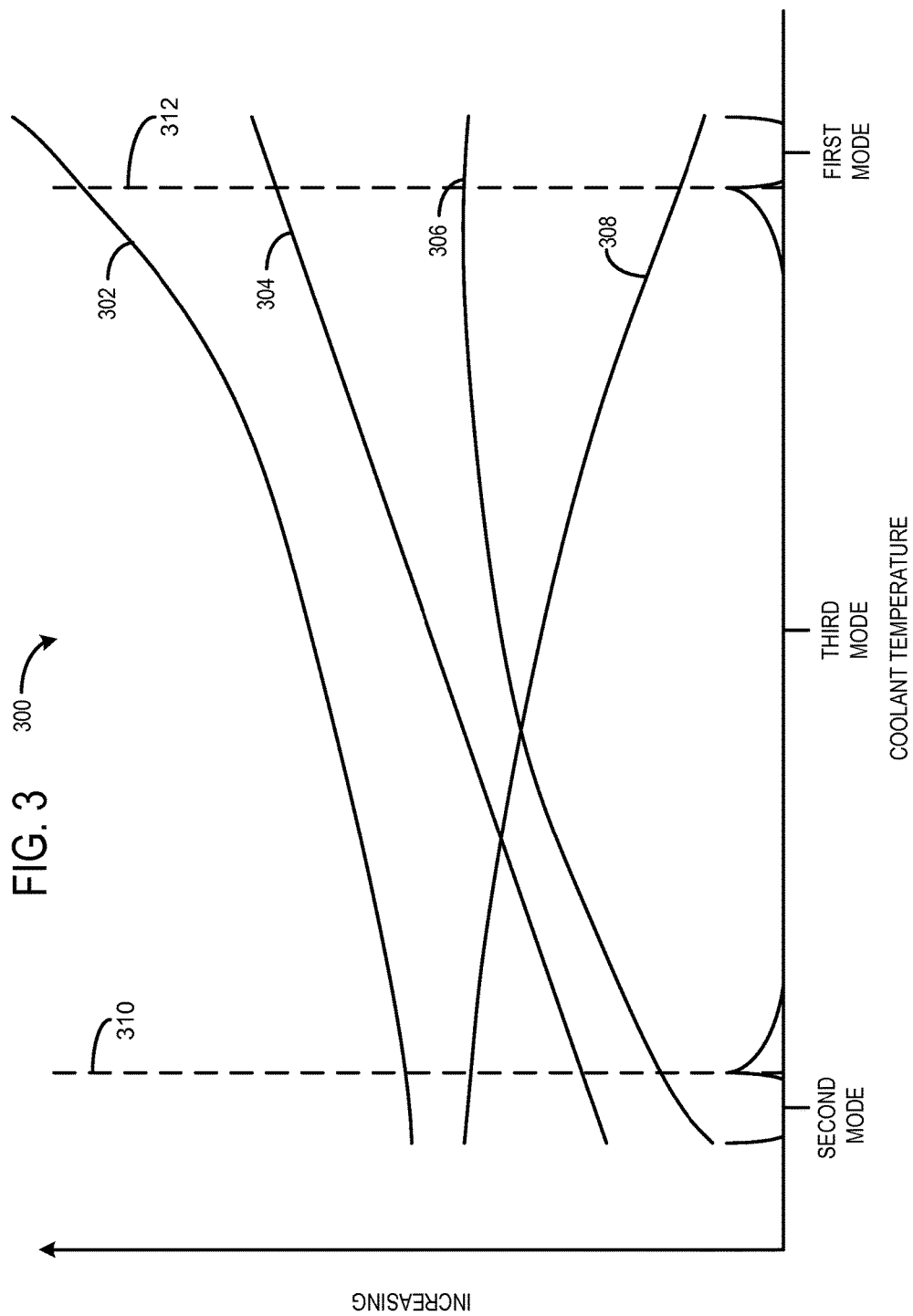

SYSTEM AND METHOD FOR FLOWING A MIXTURE OF COOLANTS TO A CHARGE AIR COOLER

FIELD

The present description relates generally to methods and systems for controlling a vehicle engine to adjust a temperature of intake air delivered to the engine via flowing one or more coolants of a different temperature to a charge air cooler.

BACKGROUND/SUMMARY

Internal combustion engines, such as turbocharged diesel engines, include cooling systems to limit temperatures of various engine components. Internal combustion engines are known to be designed with internal cooling passages fir the circulation of coolant to remove thermal energy from the engine components. Additionally, internal combustion engines often utilize turbochargers to increase power by compressing an intake combustion air to a higher density. Such compression results in the heating of the combustion air, which may then be cooled prior to its use via a charge air cooler (or intercooler) to enable the engine to have high volumetric efficiency and low emissions of exhaust pollutants.

It is often desirable to maintain an internal combustion engine and its associated intake combustion air at different temperatures based on engine operation in order to optimize the performance of the engine. Consequently, many internal combustion engines flow a single coolant through a variety of coolers and heat transfer devices in order to alter a temperature of the coolant and ultimately, a temperature of the engine, the inventors herein have recognized potential issues with such systems. As one example, heating and/or cooling a single coolant may not be rapid enough to meet engine intake air temperature demands during engine operation shifts. As a result, engine performance may be decreased and emissions may increase during a length of time needed to heat and/or cool a coolant to a desired coolant temperature that produces a desired intake air temperature of intake air to the engine.

In one example, the issues described above may be addressed by a method for flowing a mixture of coolants, including a first coolant at a first temperature and a second coolant at a second temperature, lower than the first temperature, to a charge air cooler. A temperature of the mixture of coolants is altered via adjusting a ratio of the first coolant to the second coolant in response to an engine operating condition and an outlet temperature of the charge air cooler. In this way, a temperature of intake air delivered to the engine, downstream from the charge air cooler, may be controlled under a variety of engine operating conditions, thereby increasing engine efficiency.

As one example, only a first coolant at a higher, first temperature may be used during a first mode in order to increase a temperature of one or more of an engine, a CAC, and an intake air temperature. Further, only a second coolant at a lower, second temperature may be used during a second mode in order to decrease a temperature of one or more of the engine, the CAC, and the intake air temperature. A combination of the first (e.g., hotter) coolant and the second (e.g., cooler) coolant may be used to either increase or decrease one or more of the engine temperature, the CAC temperature, and the engine intake air temperature based on a ratio of the hotter to cooler coolant. In this way, the CAC temperature, the engine temperature, and/or the intake air temperature may be gradually changed or more dramatically changed based on operation in either the third mode or the first/second modes, respectively.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A illustrates a flow chart for determining if conditions for either a first mode, second mode, or third mode for flowing one or both of a high temperature coolant and a low temperature coolant to a CAC are met.

FIG. 2C illustrates a flow chart for carrying out the second mode.

FIG. 2D illustrates a flow chart for carrying out the third mode.

FIG. 3 illustrates a plot graphically depicting adjustments made in response to being in either the first mode, the second mode, or the third mode.

DETAILED DESCRIPTION

Figure 1:
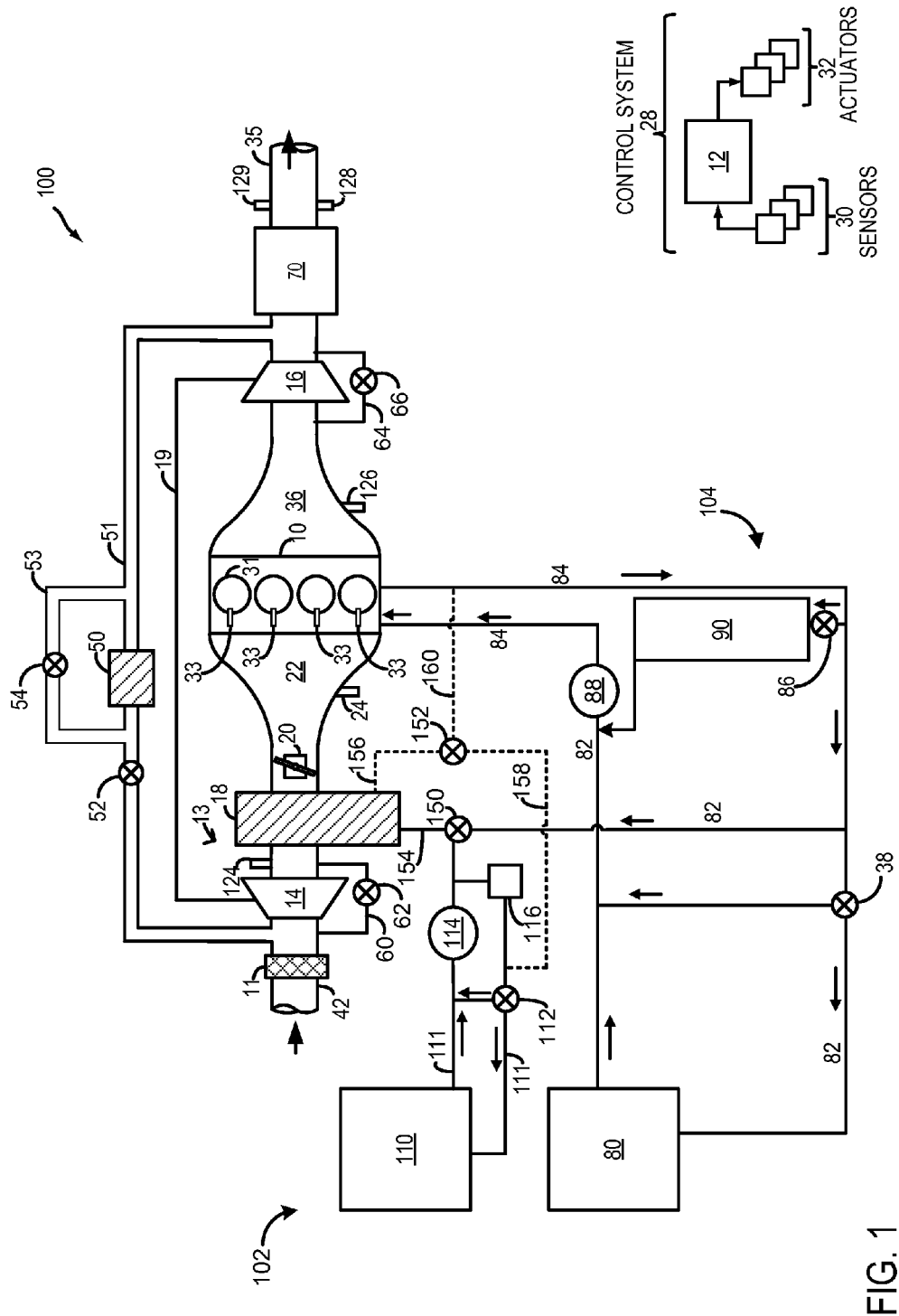
FIG. 1 illustrates a four cylinder engine with a charge air cooler fluidly coupled to a high temperature coolant loop and a low temperature coolant loop.
Figure 2B:
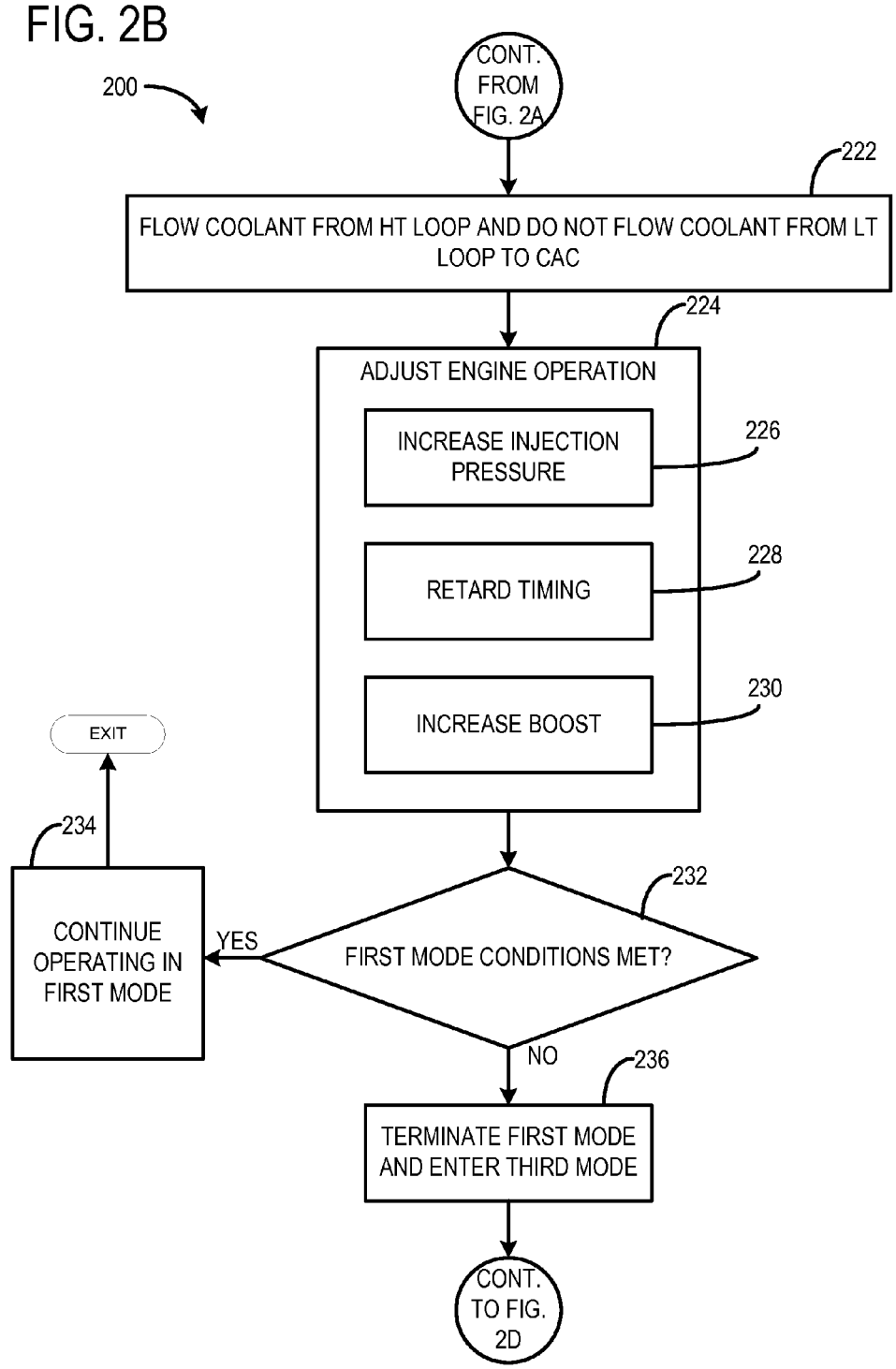
FIG. 2B illustrates a flow chart for carrying out the first mode.
Figure 4:
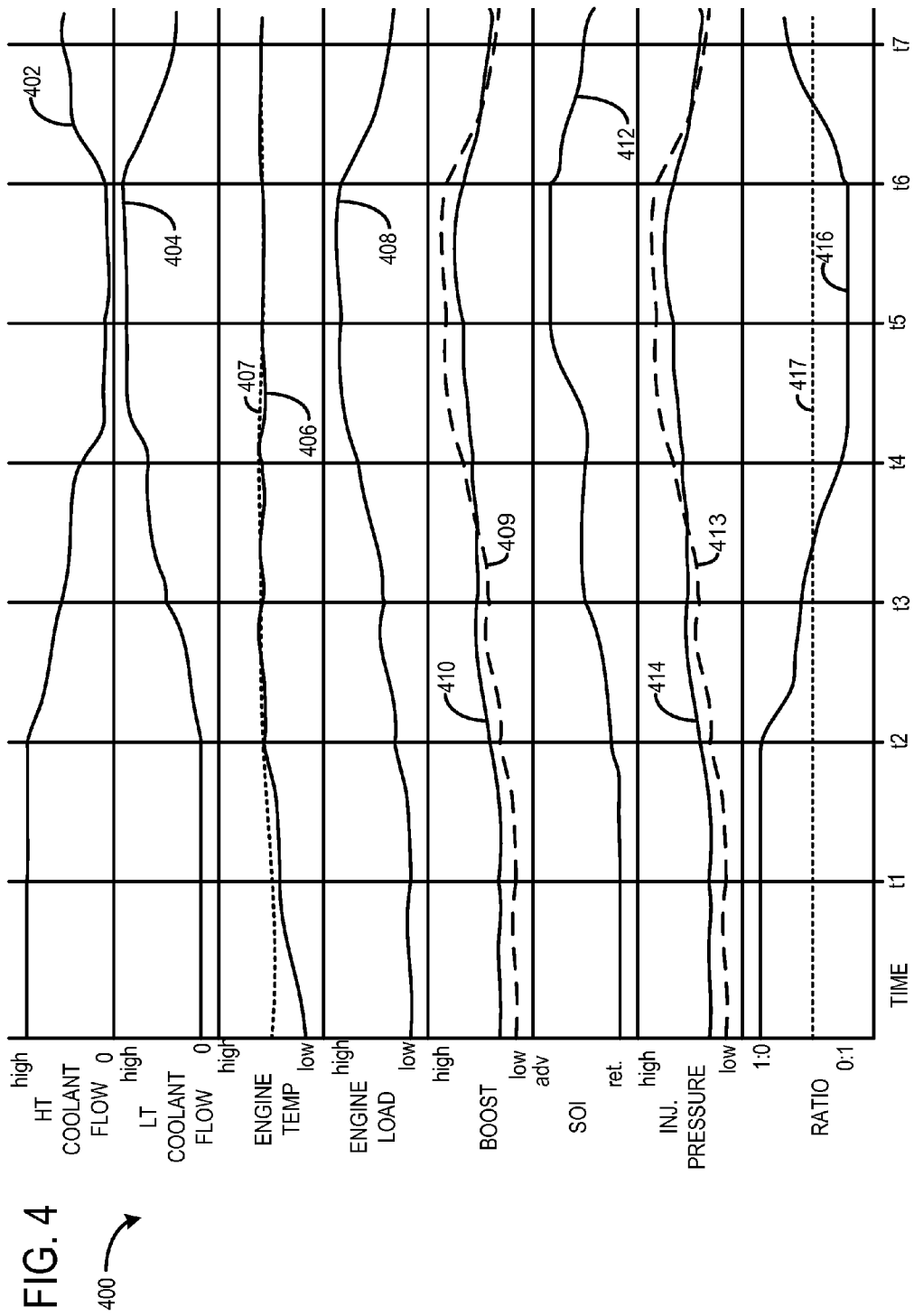
FIG. 4 illustrates a graph depicting example engine conditions and engine operation in response to a CAC receiving only a high temperature coolant, a low temperature coolant, or a combination of the high temperature and the low temperature coolants.

The following description relates to systems and methods for adjusting an intake air temperature delivered to an engine, such as the engine system shown in FIG. 1. For example, the intake air temperature may be adjusted by flowing one or more different temperature coolants to a charge air cooler (CAC) positioned upstream of the engine based on one or more engine operating conditions. In one example, a first coolant is provided from a higher temperature coolant loop while a second coolant is provided from a lower temperature coolant loop, as shown in FIG. 1. Based on engine operation and a condition of the CAC, a vehicle may enter a first, a second, or a third cooling mode, as shown in FIG. 2A. During the first mode, only the first coolant from the higher temperature loop is delivered to the CAC, as shown in FIG. 2B. During the second mode, only the second coolant is delivered to the CAC, as shown in FIG. 2C. During the third mode, a combination (e.g., a ratio) of the first coolant and the second coolant are delivered to the CAC, as shown in FIG. 2D. Engine adjustments may be made in response to being in either the first, the second, or the third modes, as shown in FIG. 3. An example engine operation accompanied with corresponding engine adjustments according to a cooling mode of operation (e.g., first mode, second mode, or third mode) is shown in FIG. 4.

Turning now to FIG. 1, engine 10 is a boosted engine coupled to a turbocharger 13 including a compressor 14 driven by a turbine 16 in an engine system 100. Specifically, fresh air is introduced along intake passage 42 into engine 10 via air cleaner 11 and flows to compressor 14. The compressor 14 may be a suitable intake-air compressor, such as a motor-driven or driveshaft driven supercharger compressor. In the engine system 100, the compressor 14 is shown as a turbocharger compressor mechanically coupled to turbine 16 via a shaft 19, the turbine 16 driven by expanding engine exhaust. In one embodiment, the compressor 14 and turbine 16 may be coupled within a twin scroll turbocharger. In another embodiment, the turbocharger 13 may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC 18 may be an air-to-water heat exchanger, for example. Throttle valve 20 is coupled to engine intake manifold 22. From the compressor 14, the hot, compressed charge air enters an inlet of the CAC 18, cools as it travels through the CAC 18, and then exits to pass through the throttle valve 20 to the intake manifold 22. Condensate may form and accumulate in the CAC 18 when an ambient air temperature decreases, or during humid or rainy weather conditions, where the charge air is cooled below the water dew point. Additionally, condensate may collect at the bottom of the CAC 18, and then be drawn into the engine during acceleration (or tip-in), increasing the chance of engine misfire. Mitigation of condensate formation in the CAC will be described in further detail below.

In the embodiment shown in FIG. 1, the pressure of the air charge within the intake manifold 22 is sensed by manifold air pressure (MAP) sensor 24 and a boost pressure (e.g., boost) is sensed by boost pressure sensor 124. Boost pressure sensor 124 is located between the compressor 14 and CAC 18. MAP sensor 24 is located in the intake manifold 22 downstream of the throttle valve 20. A compressor bypass 60 may be coupled in series between the inlet and an outlet of compressor 14. A compressor bypass valve 62 of the compressor bypass 60 may be a normally closed valve configured to open under selected operating conditions to relieve excess boost pressure. For example, the compressor bypass valve 62 may be opened during conditions of decreasing engine speed to avert compressor surge.

Intake manifold 22 is coupled to a series of combustion chambers 31 through a series of intake valves (not shown). Engine 10 may be a spark ignited engine. In other embodiments, engine 10 may omit a spark plug and be a diesel engine. The combustion chambers 31 comprise in-cylinder pressure sensors 33 in order to monitor a pressure of various combustion phases (e.g., intake, compression, combustion, and exhaust) occurring within the combustion chambers 31. The combustion chambers 31 are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the compressor 14. When reduced turbine torque is desired (e.g., in order to decrease compressor speed to decrease boost), some exhaust may be directed instead through a wastegate 64 bypassing the turbine 16. An amount of exhaust allowed to pass through the wastegate 64 may be determined by a position of wastegate valve 66. For example, the wastegate valve 66 in a fully opened position may allow a maximum amount of exhaust to bypass the wastegate 16, and therefore provide a minimal amount of boost. Conversely, the wastegate valve 66 in a fully closed position does not allow exhaust to bypass the wastegate 16. A combined flow from the turbine 16 and the wastegate 64 flows through an emission control device 70. In general, one or more emission control devices 70 may include one or more exhaust aftertreatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Exhaust conduit comprises sensors 128 and 129. Sensor 128 may be a soot sensor and sensor 129 may be an exhaust gas temperature sensor. It will be appreciated by someone skilled in the art that sensors 128 and 129 may be other suitable sensors (e.g., exhaust composition sensor, $NO_x$ sensor, etc.). Depending on operating conditions, however, some exhaust may be diverted to EGR passage 51, through EGR cooler 50 and EGR valve 52, and to the inlet of compressor 14. Additionally, a portion of exhaust gas may be bypassed around the EGR cooler 50 via an EGR cooler bypass valve 54 located in an EGR bypass line 53. The EGR cooler bypass valve 54 may be opened (e.g., fully opened or at least partially opened) to admit at least a portion of exhaust gas through the EGR bypass line 53. Exhaust gas flowing through the EGR bypass line 53 does not flow to the EGR cooler 50. Therefore, exhaust in the EGR bypass line 53 is hotter than exhaust flowing through the EGR cooler 50. The EGR cooler bypass valve 54 may be adjusted by a controller 12 based on an engine load, intake manifold temperature, and/or other suitable conditions.

In this manner, the compressor is configured to admit exhaust tapped from downstream of turbine 16 and upstream of the emission control device 70. The EGR valve 52 may be opened to admit a controlled amount of cooled exhaust gas to the compressor 14 for desirable combustion and emissions-control performance. In this way, engine system 100 is adapted to provide external, low-pressure (LP) EGR. The rotation of the compressor 14, in addition to the relatively long LP EGR flow path in engine system 100, provides excellent homogenization of the exhaust gas into the intake air charge. Alternatively, engine system 100 could be equipped with a high pressure (HP) EGR system which intercepts EGR upstream of the turbine 16 and injects EGR after the throttle 20. In some embodiments, engine system 100 can be equipped with both LP and HP EGR systems.

Engine system 100 further includes a first cooling circuit 104 that circulates a first coolant through internal combustion engine 10. The first coolant in the first cooling circuit 104 may also be referred to herein as a hotter coolant that is hotter than a cooler, second coolant circulating through a second coolant circuit 102, as described further below. For example, the first coolant flowing through the first coolant circuit 104 has a higher temperature than the second coolant circulating through the second coolant circuit 102. Arrows on the first coolant circuit indicate a direction of first coolant flow. The first cooling circuit 104 may also be referred to herein as the first coolant circuit or the first coolant loop. The first coolant circuit 104 comprises a first coolant line 82 and a second coolant line 84. An engine coolant control valve 38, a radiator 80, a CAC inlet valve 150, and first coolant pump 88 are fluidly coupled to the first coolant line 82. The engine 10, a CAC outlet valve 152, and heater core 90 are fluidly coupled to the second coolant line 84. A first coolant valve 86 is fluidly coupled to the second coolant line 84. The engine coolant valve 38 may control a flow of coolant exchange between the first coolant line 82 and the second coolant line 84.

The radiator 80 is located downstream of engine coolant valve 38. The radiator 80 may cool the first coolant via a series of heat transfer surfaces fluidly coupled to ram air. The engine coolant valve 38 typically known as a thermostat controls the temperature of the first coolant by directing the first coolant to the radiator 80 in a first position (e.g., an open position). The engine coolant valve 38 may further direct the first coolant to the coolant pump 88 in a second position (e.g., a closed position). The ram air may further pass over the heater core 90 and flow into a vehicle passenger compartment in order to provide cabin heat.

When the engine coolant valve 38 is at least partially open, the pump 88 may force coolant from the second coolant line 84, into the first coolant line 82, and into the engine 10. Hotter coolant leaving the engine 10 flows into the second coolant line 84 and the first coolant valve 86 is used to regulate coolant flow to the heater core (90). First coolant flowing through the heater core 90 is redirected to the coolant pump 88 before being pumped to the engine 10. First coolant flowing through second coolant loop 84 may flow to either the first radiator 80 and/or to the water pump (88) based on the position of valve (38). Additionally first coolant flows to the CAC inlet valve 150.

The first coolant valve 86 may operate based on a first coolant temperature determined via a temperature sensor and cabin heat requirement. The engine control valve (38) may flow a greater portion of first coolant toward the first radiator 80 compared to the water pump (88) if the first coolant temperature is greater than a threshold temperature (e.g., 110° C.). In one example, first coolant may continuously flow from the engine 10 to the water pump (88) without flowing into any components located along the first coolant line 82 when the first coolant temperature is less than the threshold temperature.

Alternatively, first coolant flowing out of the first radiator 80 in the first coolant line 82 flows through the second coolant line 84 (e.g., into the engine 10 and potentially into the heater core (90) or the CAC 18) prior to returning to the first radiator 80. First coolant flowing through the CAC inlet valve 150 will be described in further detail below. In other embodiments, the first coolant from the first coolant circuit 104 may be diverted from an alternate location from the first coolant circuit 104 to the CAC 18 (e.g., at the outlet of the water pump (88)).

The engine system 100 further comprises a second coolant circuit 102 flowing a second coolant. The second coolant circuit 102 is a lower temperature coolant circuit than the first coolant circuit 104. The second coolant circuit 102 comprises a second radiator 110, second coolant control valve 112, a second coolant pump 114, and a cooler 116 located along second coolant line 111. The second coolant line 111 is also fluidly coupled to the CAC inlet valve 150. The second radiator 110 is a double pass radiator (e.g., the second coolant flows through the second radiator 110 twice before flowing to the second coolant control valve 112). The second radiator 110 cools the second coolant in a similar manner to the first radiator 80, but with the second coolant control valve (112) or second thermostat set to a lower temperature threshold (e.g., 95° C.). For example, the second coolant may be 50° C., while the first coolant is 90° C. The second coolant may also be referred to herein as a cooler coolant (e.g., cooler than the first coolant).

As depicted, the second coolant circuit 102 is not fluidly coupled to the engine 10. The second coolant circuit 102 is fluidly coupled to the cooler 116 and CAC coolant conduit 154 leading to the CAC 18. The cooler 116 may be a fuel cooler, a transmission oil cooler, and/or an AC condenser. In one embodiment, the cooler 116 may also be an EGR cooler (e.g., EGR cooler 50). The cooler 116 lies downstream of the second coolant control valve 112 and the second coolant pump 114. The second coolant and the first coolant do not mix, unless both are directed through the CAC control valve 150, into the CAC coolant conduit 154, and into the CAC 18. Said another way, upstream of CAC control valve 150, no coolant mixing occurs between the first and second coolants.

In one embodiment, the first coolant and second coolant may not mix. The first coolant and second coolant may flow to separate portion of the CAC 18 such that the first coolant circuit 102 is fluidly coupled to the CAC 18 via a first CAC coolant conduit. The second coolant circuit 104 is fluidly coupled to the CAC 18 via a second CAC coolant conduit separately from the first CAC coolant conduit. In this way, the first coolant and the second coolant may flow to separate portions of the CAC 18 without mixing and cool different portions of the CAC.

The second coolant may also flow to the CAC 18 via CAC inlet valve 150. The CAC inlet valve 150 is a three-way valve. Therefore, the second coolant may flow to the CAC 18 when second coolant control valve 112 and a portion of CAC inlet valve 150 corresponding to the second coolant are at least partially open.

The CAC inlet valve 150 may permit one or more of the first coolant and the second coolant to flow to the CAC 18. The CAC inlet valve 150 may allow varying portions of the first and second coolants through to the CAC 18 such that a ratio of first coolant to second coolant delivered to the CAC 18 may be adjusted based on an engine operation.

In one example, during a first mode, the CAC inlet valve 150 may only allow the first coolant (i.e., the hotter coolant) to flow to the CAC 18. During a second mode, the CAC inlet valve 150 may only allow the second coolant (i.e., the cooler coolant) to flow to the CAC 18. During a third mode, the CAC inlet valve 150 may allow a combination of the first coolant and the second coolant, at a determined ratio of the first to second coolants, to flow to the CAC 18 in order for intake air leaving the CAC and flowing to the engine cylinders to reach a desired CAC outlet temperature. The ratio may be based on the desired CAC outlet temperature (e.g., desired intake air temperature to the engine, also referred to as a desired intake manifold temperature). As the desired CAC outlet temperature increases, the ratio increases (e.g., increased flow of first coolant and decreased flow of second coolant). The first and second coolants mix and/or blend in CAC coolant conduit 154 prior to reaching the CAC 18. In this way, a temperature of the coolant mixture may be based on the ratio of the first and second coolants flowing into the CAC coolant conduit 154.

In some embodiments, the temperature of the coolant mixture may be measured by a temperature sensor located in CAC coolant conduit 154. In other embodiments, the temperature of the coolant mixture may be inferred based on the ratio of the first to second coolants.

The CAC outlet valve 152 is fluidly coupled to both the first coolant circuit 104 and the second coolant circuit 102 via coolant outlet line 156. A position of the CAC outlet valve 152 is substantially equal to a position of the CAC inlet valve 150. For example, if CAC inlet valve 150 is open to only the second coolant, then the CAC outlet valve 152 may only allow coolant from the CAC 18 to flow to the second coolant circuit 102, without flowing to the first coolant circuit 104. Additionally, if the CAC inlet valve 150 is allowing a ratio of the first and second coolant, then the CAC outlet valve 152 allows a substantially equal portion of each coolant to flow back to its respective circuit.

Coolant leaving the CAC 18 flows through the CAC outlet conduit 156 before reaching the CAC outlet valve 152. Depending on the ratio of coolant that flowed into the CAC 18, a substantially equal ratio of coolant flows out of the CAC 18. In other words, the first coolant circuit 104 receives an amount of first coolant from the CAC 18 substantially equal to an amount of first coolant provided to the CAC via the first coolant circuit 104. Likewise, the second coolant circuit 102 receives an amount of second coolant from the CAC 18 substantially equal to an amount of second coolant provided to the CAC from the second coolant circuit 102. Coolant flowing through the CAC outlet valve 152 to the first coolant circuit 104 flows through a first passage 160 and into the second coolant line 84 of the first coolant circuit 104. Coolant flowing through the CAC outlet valve 152 to the second coolant circuit 102 flows through a second passage 158 and into second coolant line 111, downstream of the cooler 116.

As an example, the controller 12 may adjust the CAC inlet valve 150 to a first position to allow only the first coolant from the first coolant circuit 104 to flow to the CAC 18 during a first engine operating condition (e.g., cold-start). During a second engine operation condition (e.g., engine load greater than an upper threshold), the controller 12 may adjust the CAC inlet valve 150 to a second position to allow only the second coolant from the second coolant circuit 102 to flow to the CAC 18. During a third engine condition (e.g., engine load below the upper threshold), the controller 12 may adjust the CAC inlet valve 150 to a third position to allow both the first coolant and the second coolant to flow to the CAC 18. The third position of the CAC inlet valve may be a variable position such that a ratio of the first coolant to the second coolant may be adjusted to a plurality of ratios between a ratio that only flows the first coolant to the CAC and a ratio that only flows the second coolant to the CAC.

In some embodiments, additionally or alternatively, the controller 12 may adjust the CAC inlet valve 150 to a first position based on an intake manifold temperature being less than a lower threshold temperature (e.g., 50° C.), to a second position based on the intake manifold temperature being greater than an upper threshold temperature (e.g., 90° C.), or to a third position based on the intake manifold temperature being between the lower threshold temperature and the upper threshold temperature. Thus, the coolant circuits 102 and 104 may be used to adjust the intake manifold temperature.

In some embodiments, additionally or alternatively, the controller 12 may adjust the CAC inlet valve 150 to the first position based on a cylinder pressure being less than a lower threshold cylinder pressure, to the second position based on a cylinder pressure being greater than an upper threshold cylinder pressure, or to a third position based on a cylinder pressure being between the lower threshold cylinder pressure and the upper threshold cylinder pressure. The lower threshold cylinder pressure and upper threshold cylinder pressure are dependent upon a phase of the combustion cycle. For example, the lower threshold cylinder pressure for the intake phase may be 10 psi while the lower threshold cylinder pressure for the compression phase may be 75 psi. Thus, the coolant circuits 102 and 104 may be used to adjust the cylinder pressure based on an in-cylinder pressure measurement provided by the in-cylinder pressure sensors 33. In another embodiment, additionally or alternatively, the controller 12 may adjust the CAC inlet valve 150 to the first position based on air flow decreasing below a threshold air flow.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

The controller 12 receives signals from the various sensors of FIG. 1 and employs the various actuators of FIG. 1 to adjust engine operation based on the received signals and instructions stored on a memory of the controller. For example, controller 12 may actuate the CAC inlet valve 150 and CAC outlet valve 152 based on one or more of a CAC outlet temperature, a CAC condensate level, an engine temperature, and a desired intake manifold air temperature.

Turning now to FIGS. 2A-D, a method 200 for adjusting a delivery of a hotter coolant, cooler coolant, or mixture of the hotter and cooler coolants to a CAC based on engine operation is depicted. While FIG. 2A shows a method for determining which temperature coolant or mixture of coolants to flow to the CAC, FIGS. 2B-D show methods for adjusting engine operation based on delivery of the selected temperature coolant. Instructions for carrying out method 200 may be executed by a controller (e.g., controller 12) based on instructions stored on a memory of the controller and in conjunction with signals received from sensors of the engine system, such as the sensors described above with reference to FIG. 1. The controller may employ engine actuators of the engine system to adjust engine operation, according to the methods described below.

In one example, the method 200 may be used for flowing a mixture of coolants, including a first coolant at a first temperature and a second coolant at a second temperature, to a CAC. A temperature of the mixture may be adjusted via adjusting a ratio of the first coolant to the second coolant in response to one or more of an engine operating condition and a CAC outlet temperature. The first coolant may herein be referred to as hotter coolant and the second coolant may herein be referred to as cooler coolant since the first coolant has a temperature greater than the second coolant.

The first, second, and third modes are different cooling modes of the CAC that flow different temperatures and ratios of coolants based on an engine operation. During the first mode, only a first, higher temperature coolant flows to the CAC without flowing a second, lower temperature coolant to the CAC. During the second mode, only the second, lower temperature coolant flows to the CAC without flowing the first, higher temperature coolant to the CAC. During the third mode, a mixture of both the first, higher temperature coolant and the second, lower temperature coolant flow to the CAC. A composition of the mixture may be based on the engine operation. Further, the first temperature coolant and the second temperature coolant are fluidly separated upstream of the CAC. For example, as shown in FIG. 1, the first and second coolants circulate through different and fluidly separate engine cooling circuits. Said another way, no coolant mixing occurs between the first and second coolants upstream of a CAC inlet valve (e.g., CAC inlet valve 150) used to adjust the flow of coolants to the CAC.

The method 200 begins at 202 to determine, estimate, and/or measure current engine operating parameters. The engine operating parameters may include, but are not limited to engine load, engine speed, manifold vacuum, catalyst temperature, boost, CAC outlet temperature, CAC condensate level, spark timing, fuel injection timing and pressure, particulate matter output, and air/fuel ratio. As one example, the CAC condensate level may be an amount of liquid condensate accumulated within the CAC and may be based on one or more of CAC inlet and outlet temperature, CAC inlet and outlet pressure, ambient humidity, ambient temperature, EGR Rate, air-fuel ratio and/or barometric pressure.

At 204, the method 200 includes monitoring first mode conditions. The first mode conditions include low load 206, a catalyst not being lit off 208, and heat maintenance 210. The low load may be based on an engine load being less than a lower threshold load. The catalyst not being lit off may be defined as a catalytic converter, three-way catalyst (TWC), or other exhaust catalysts of the like included in an emission control device of the engine system not reaching a light-off temperature. Heat maintenance may be defined as maintaining a temperature of various engine components within desired operating ranges. The method 200 may flow only the first coolant in response to engine load below a threshold load, a catalyst not being lit-off, engine temperature below a threshold temperature, a CAC outlet temperature below a threshold CAC outlet temperature (e.g., the threshold CAC outlet temperature may indicate or result in increased condensate formation), and condensate formation within the charge air cooler increasing above a threshold level (e.g., increasing to a condensate level that may result in an engine misfire or unstable combustion if all the condensate is ingested by the engine at once).

At 212, the method 200 includes determining if one or more of the first mode conditions at 204 are met. If one or more of the conditions at 204 are met, then the method 200 proceeds to 222 of FIG. 2B, as will be discussed below with respect to FIG. 2B.

As an example, the first mode may be initiated during a cold-start, in which engine load is below a threshold load and a catalyst has not reached the light off temperature. The first mode flows only hotter coolant (e.g., the first temperature coolant) from a high temperature coolant loop (e.g., first coolant circuit 104 shown in FIG. 1) and not the cooler coolant to the CAC (e.g., such as CAC 18 shown in FIG. 1). In this way, a CAC outlet temperature and thus a temperature of intake air delivered to the engine may increase at a more rapid rate in order to both reduce emissions and reach a desired engine air temperature (e.g., approaching 90° C.).

If none of the conditions at 204 are met, then the method 200 proceeds to 214 to monitor second mode conditions, which include an engine load being high, as shown at 216, and engine knock, as shown at 217. An engine load is high if the engine load is greater than an upper threshold load.

At 218, the method determines if second mode conditions 216 are met. If second mode conditions 216 are met, then the method 200 proceeds to 238 of FIG. 2C, as will be discussed with respect to FIG. 2C.

As an example, the second mode may be initiated when an engine load is high load. When the engine load is a high load, an engine temperature may be greater than a threshold engine temperature or a CAC outlet temperature may be too high. The threshold engine temperature may be based on one or more of a durability of engine components and emissions. Therefore, an engine temperature being greater than the threshold engine temperature both jeopardizes a stability of engine components while also producing increased emissions. Thus, the second mode flows only cooler coolant from the low temperature coolant loop to the CAC in order to decrease a temperature of the engine during higher loads.

If conditions for the second mode are not met, then the method 200 proceeds to 220 to initiate the third mode. Initiating the third mode includes flowing a ratio of a hotter coolant and a cooler coolant to the CAC, as will be discussed further below with respect to FIG. 2D.

Turning now to FIG. 2B, a continuation of method 200 includes operating in the first mode is depicted. During the first operating mode, only the hotter coolant and not the cooler coolant flows to the CAC. In this way, a temperature of the coolant flowing to and through the CAC may be increased by flowing only the first coolant and not the second coolant to the CAC in response to current engine operating conditions detected at 204.

Specifically, at 222, the method 200 includes flowing hotter coolant from the high temperature coolant loop (e.g., first coolant circuit 104 of FIG. 1) to the CAC, while not flowing cooler coolant from the low temperature coolant loop (e.g., second coolant circuit 102 of FIG. 1) to the CAC. Hotter coolant from the high temperature loop is higher in temperature than cooler coolant from the low temperature loop. As one example, the hotter coolant may be approximately 90° C. whereas the cooler coolant may be approximately 50° C. The method at 222 may include adjusting, via the controller, a CAC inlet valve (e.g., CAC inlet valve 150 of FIG. 1) into a first position that is open to the high temperature coolant loop and closed to the low temperature coolant loop such that only hotter coolant from the high temperature coolant loop flows through the CAC inlet valve and to a coolant inlet of the CAC.

At 224, the method 200 includes adjusting engine operation in response to the hotter coolant flowing to the CAC. Furthermore, the intake air temperature increases in response to flow of only the hotter coolant to the CAC. As a result, particulate matter output may also increase. In order to circumvent the particulate matter increase and/or assist in increasing the engine temperature, the adjustments may include one or more of increasing a primary injection pressure 226, delaying a start of injection (SOI) 228, and increasing boost 230. The primary injection pressure 226 is a pressure of fuel injected during a main injection for a combustion stage of an engine cycle. The SOI is substantially equal to an injection timing. The aforementioned adjustments aid in further increasing an engine temperature such that emissions may be reduced and catalyst light off may occur. Additionally or alternatively, the method 200 may further bypass an EGR cooler and flow hotter EGR to an intake manifold in order to further assist increasing the engine temperature.

In one example, additionally or alternatively, the first mode may be initiated in response to a condensate level in the CAC exceeding a threshold condensate level. The threshold condensate level may be based on a likelihood of engine knock or misfire due to ingestion of water. Adjustments when the first mode is initiated in response to the condensate level in the CAC exceeding the threshold condensate level may include decreasing boost, increasing injection pressure, and delaying the SOI. Boost is decreased in order to reduce a pressure of the CAC to further limit condensate formation in the CAC and to reduce an amount of condensate being ingested by the engine.

In another example, additionally or alternatively, the first mode may be initiated in response to one or more of decreasing engine load, the outlet temperature of the charge air cooler decreasing below a desired outlet temperature, an intake manifold air temperature (e.g., a temperature of the air in the intake manifold, measured upstream of engine cylinders) decreasing below a threshold intake manifold air temperature, combustion phasing retarding beyond a target timing (e.g., compression occurs later than a nominal compression), decreasing engine temperature, decreasing after-treatment temperature, and increasing condensate formation in the charge air cooler. The threshold intake manifold temperature may be based on a temperature at which condensate formation increases. Additionally or alternatively, the threshold intake manifold temperature may be based on a lower temperature threshold that results in unstable combustion.

At 232, the method 200 includes determining if first mode conditions 204 are still met. If first mode conditions are still met then the method 200 may proceed to 234 to continue operating in the first mode.

If the first mode conditions are no longer met, then the method 200 proceeds to 236 to terminate the first mode and enter the third mode, as will be discussed in further detail with respect to FIG. 2D.

In one example, additionally or alternatively, the method 200 may enter the second mode upon terminating the first mode. In such an example, the method 200 may switch a CAC inlet valve (e.g., CAC inlet valve 150) to a second position in order to allow only the flow of cooler coolant to the CAC. In this way, the CAC may transition from receiving hotter coolant to receiving cooler coolant without receiving a mixture of coolants during the transition from the first mode to the second mode.

Turning now to FIG. 2C, a continuation of the method 200 depicts entering a second mode and adjusting engine operations based on the second mode. The second operating mode includes flowing the cooler coolant and not the hotter coolant to the CAC. As such, the temperature of the coolant flowing to the CAC decreases and, in turn, the CAC outlet temperature and the temperature of intake air flowing to the engine also decreases. The second operating mode is initiated in response to conditions at 214 being met. The second operating mode may also be initiated based on engine knock and an engine temperature exceeding an upper threshold engine temperature.

At 238, the method 200 initiates the second mode by flowing the cooler coolant from the low temperature coolant loop to the CAC without flowing the hotter coolant from the high temperature coolant loop to the CAC. In this way, a temperature of boost air passing through the CAC may be reduced. The method at 238 may include adjusting, via the controller, a CAC inlet valve (e.g., CAC inlet valve 150 of FIG. 1) into a second position that is open to the low temperature coolant loop and closed to the high temperature coolant loop such that only cooler coolant from the low temperature coolant loop flows through the CAC inlet valve and to a coolant inlet of the CAC.

At 240, the method 200 includes adjusting engine operation in response to entering the second mode. Additionally or alternatively, the second mode may be initiated in response to one or more of increasing engine load, the outlet temperature of the charge air cooler increasing above a desired outlet temperature, intake manifold temperature increasing above a desired intake manifold temperature increasing engine temperature, increasing after-treatment temperature, an intake air flow rate or amount flowing to the engine dropping below a threshold value, and decreasing condensate formation in the charge air cooler.

By flowing the cooler coolant to the CAC, the intake air temperature decreases and results in decreased hydrocarbon emissions and increased engine stability. Therefore, the adjustments may include, but are not limited to, one or more of decreasing boost at 242, advancing SOI at 244, and decreasing injection pressure at 246 due to the increased engine stability. Additionally or alternatively, an EGR cooler bypass valve may be fully closed in order to direct all exhaust in an EGR line to an EGR cooler in order to further assist decreasing an intake air temperature. Alternatively, an EGR valve may be fully closed to prevent EGR from flowing to the intake manifold. The aforementioned adjustments may assist in optimizing engine performance and the new, lower intake air temperature. In one example, an engine may enter the second mode in response to an engine temperature exceeding a threshold engine temperature. In order to maintain engine component stability along with reducing emissions, the engine enters the second mode. The second mode decreases the CAC outlet temperature, which in turn decreases the engine temperature.

At 248, the method 200 determines if the second mode conditions 216 are still met. If the second mode conditions are still met, then the method 200 proceeds to 250 to continue operating in the second mode.

If the second mode conditions are no longer met, then the method 200 proceeds to 252 to terminate the second mode and initiate the third mode, as will be described in further detail with respect to FIG. 2D.

In one example, additionally or alternatively, the method 200 may enter the first mode upon terminating the second mode. In such an example, the method 200 may switch the CAC inlet valve to a first position in order to allow only the hotter coolant to flow to the CAC. In this way, the CAC may transition from receiving cooler coolant to receiving hotter coolant without receiving a mixture of the hotter and cooler coolant during the transition from the second mode to the first mode.

Turning now to FIG. 2D, a continuation of method 200 for initiating and operating in a third mode is depicted.

At 254, the method 200 includes initiating the third mode by flowing a ratio (e.g., a mixture) of hotter coolant from the high temperature loop and cooler coolant from the low temperature loop. The ratio may be based on a combination of one or more of a desired engine operating temperature, a CAC outlet temperature, and a CAC condensate level. The method at 254 may include adjusting, via the controller, a CAC inlet valve (e.g., CAC inlet valve 150 of FIG. 1) into a third position that is open to both the high temperature coolant loop and the low temperature coolant loop such that a combination of hotter coolant from the high temperature coolant loop and cooler coolant from the low temperature coolant loop flow through the CAC inlet valve and to a coolant inlet of the CAC. The hotter and cooler coolants mix in the coolant inlet of the CAC.

The ratio (e.g., hotter coolant/cooler coolant) may cover a range of temperatures between a temperature of the hotter coolant and a temperature of the cooler coolant. For example, the temperature may be between 50°-90° C. Increasing a temperature of the ratio includes increasing a ratio of the hotter coolant to the cooler coolant. This may be done in response to one or more of decreasing engine load, the CAC outlet temperature decreasing below a desired CAC outlet temperature, an engine temperature being less than a desired engine temperature, and increasing condensate formation in the CAC. Decreasing the temperature of the ratio includes decreasing a ratio of the hotter coolant to the cooler coolant. This may be done in response to one or more of increasing engine load, CAC outlet temperature increasing above a desired CAC outlet temperature, engine temperature increasing above the desired engine temperature, and decreasing condensate formation in the CAC.

At 256, the method 200 mixes the hotter coolant with the cooler coolant upstream of the CAC. The hotter coolant and cooler coolant mix in the coolant inlet of the CAC in order to provide a uniform coolant temperature to the CAC. For example, the hotter coolant and cooler coolant may mix in the CAC coolant conduit 154 before reaching the CAC 18.

At 258, the method 200 includes adjusting engine operation based on a previous engine operation (e.g., if a previous engine operation was the first mode or the second mode). For an engine transitioning from the first mode to the third mode, the adjustments may include decreasing and/or maintaining boost, advancing SOI, increasing post-injection fuel quantity, and decreasing injection pressure in order to assist cooling down an engine temperature and/or a CAC temperature. The boost may be decreased when the ratio of coolant flow comprises more cooler coolant than hotter coolant. When transitioning from the first mode to the third mode, a CAC temperature decreases. Furthermore, an EGR bypass valve is adjusted from a more open position to a less open position or from a less open position to a more open position based on transition from the first mode or the second mode to the third more, respectively.

For an engine transitioning from the second mode to the third mode, the adjustments may include increasing boost, retarding SOI, increasing a post-injection fuel quantity, and increasing injection pressure in order to assist heating up an engine temperature and/or a CAC temperature. When transitioning from the second mode to the third mode, a CAC temperature increases. At 260, the method 200 includes adjusting the ratio of hotter coolant to cooler coolant based on engine conditions. The ratio may be adjusted based on one or more of a desired engine temperature, engine load, particulate matter output, CAC output temperature, and CAC condensate load. For example, during operation of the third mode, the engine temperature may increase and as a result, the particulate matter output may increase. In order to decrease the particulate matter output, the ratio may be adjusted such that a greater volume of cooler coolant than hotter coolant flows to the CAC in order to reduce the intake air temperature and decrease particulate matter output.

As one example, for an engine operating in the third mode with a ratio of 0.8:0.2 (e.g., 80% hotter coolant and 20% cooler coolant), a desired engine temperature decreases and as a result, the ratio may decrease correspondingly (e.g., 60%:40%). In this way, the engine remains in the third mode while the ratio is adjusted to accommodate changes to engine operation and resultant engine component temperatures via a blend of the hotter and cooler coolants.

As a second example, for an engine operating at high load with high boost with a ratio of 10%:90%, a likelihood of the CAC condensate level increasing increases due to increased pressure in the CAC (which decreases a dew point temperature of water). In order to decrease the likelihood of CAC condensate forming, the ratio may be adjusted such that the flow of hotter coolant to the CAC is increased while the flow of cooler coolant is decreased (e.g., 30%:70%). However, excess cooler coolant still flows to the CAC in order to maintain a desired engine temperature at high load while also decreasing particulate matter output.

At 262, the method 200 includes determining if conditions for the third mode are still met. Conditions for the third mode may be met if conditions for either the first mode or the second mode are not met. Other conditions for the third mode may include a desired engine temperature being greater than a lower threshold engine temperature while being less than an upper threshold engine temperature. The lower threshold engine temperature may be an engine temperature attainable via flowing only the cooler coolant to the CAC. Conversely, the upper threshold engine temperature may be an engine temperature attainable via flowing only the hotter coolant to the CAC. Therefore, a temperature between the lower threshold temperature and the upper threshold temperature may be attained via a ratio of the hotter and the cooler coolants.

Additionally or alternatively, third mode conditions may further include an engine load between a first threshold load and second threshold load, the condensate level in the CAC below a threshold condensate level, engine knock below a threshold knock level, and the catalyst being lit-off. The first threshold load may be based on a low engine load and the second threshold load may be based on a high engine load. The threshold condensate level may be based on a level of condensate in the CAC that may cause unstable combustion if all the condensate was carried to the engine.

If the conditions for the third mode are still met, then the method 200 proceeds to 264 to continue operating in the third mode. The method 200 continues to monitor third mode conditions until they are no longer met. If the conditions for the third mode are no longer met, then the method 200 proceeds to 266 to terminate the third mode and initiate either the first mode of the second mode depending on which of the mode conditions are met. Turning now to FIG. 3, a plot 300 depicts adjustments made based on operating in a first mode, second mode, or a third mode, where the three modes are the CAC coolant temperature modes described above with reference to FIGS. 2A-D. Line 302 represents a post injection fuel quantity, line 304 represents a primary injection pressure, line 306 represents boost, and line 308 represents a start of injection (SOI). Dashed lines 310 and 312 represent lower threshold and upper threshold engine temperatures, respectively. The vertical axis represents an increasing amount of the adjustment or an advancement of injection timing, increasing from the bottom side of the figure to the top side of the figure. The horizontal axis represents a respective mode and a corresponding range of the mode based on a coolant temperature (e.g., range of coolant temperature of coolant flowing to the CAC), where the coolant temperature increases from the left side of the figure to the right side of the figure. As discussed below, the coolant temperature shown on the horizontal axis is a measured or estimated temperature of the coolant delivered to the CAC, downstream of a valve that adjusts the ratio of hotter to cooler coolant delivered to the CAC (e.g., downstream of CAC inlet valve 150 shown in FIG. 1).

While operating in the first mode, only hotter coolant flows to the CAC in order to increase a temperature of one or more of the CAC and intake air to the engine. Adjustments during the first mode may include one or more of increasing the post injection fuel quantity, increasing the primary injection pressure, increasing boost, and retarding SOI. In one example, the post injection fuel quantity may be increased to an upper threshold level, the primary injection pressure may be increased to an upper threshold level, boost may be increased to an upper threshold level, and SOI may be retarded by an upper threshold amount in an effort to aid in increasing an engine temperature, CAC temperature, and/or after-treatment temperature along with decreasing a particulate matter output due to the increased intake air temperature, as described above.

As depicted, while in the second mode (e.g., flowing only cooler coolant to the CAC), adjustments may include one or more of decreasing the post injection fuel quantity, decreasing the primary injection pressure, decreasing boost, and advancing the SOI. The post injection may occur after the primary injection during an engine cycle. For example, the primary injection may be during the intake stroke while the post injection may be during the compression stroke. In one example, the post injection fuel quantity may be decreased to a lower threshold level or substantially zero, the primary injection pressure may be decreased to a lower threshold level, boost pressure may be decreased to a lower threshold level, and SOI may be advanced by an upper threshold amount. In this way, the adjustments aid the flow of the cooler coolant in decrease a temperature of one or more of the CAC and the engine and to decrease hydrocarbon output due to an increase in combustion stability, as described above.

While operating in the third mode, both the hotter coolant and the cooler coolant flow to the CAC. The post injection fuel quantity is increased compared to the second mode but decreased compared to the first mode. The primary injection pressure is increased compared to the second mode but decreased compared to the first mode. The boost is increased compared to the second mode, but less than or equal to the boost during the first mode. The SOI is retarded compared to the second mode but advanced compared to the first mode. As discussed above, the coolant temperature of coolant delivered to the CAC while in the third mode is based on the ratio of hotter coolant to cooler coolant being delivered to the CAC. Thus, as the ratio of hotter to cooler coolant increases, the coolant temperature of the third mode increases. Within the third mode, in response to coolant temperature increasing, boost is further increased. In this way, adjustments to boost within the third mode are dependent on the ratio of the hotter coolant to cooler coolant and thus the coolant temperature of coolant delivered to the CAC.

As another example, the pressure of injection and post injection fuel quantity are increased in response to the coolant temperature increasing. In this way, adjustments to the pressure of injection and post injection fuel quantity within the third mode are dependent on the ratio of the hotter coolant to cooler coolant. As another example, the SOI is retarded (e.g., SOI is delayed) as the coolant temperature increases in the third mode. In this way, adjustments to the SOI within the third mode are dependent on the ratio of the hotter coolant to cooler coolant.

When switching from the first mode to the second mode, the post injection fuel quantity is decreased, the primary injection pressure is decreased, the boost is decreased, and the SOI is advanced. Boost is decreased dependent upon a coolant temperature of coolant flowing to the CAC (e.g., downstream of CAC inlet valve 150 shown in FIG. 1). For example, boost is increasingly decreased as the coolant temperature of coolant delivered to the CAC decreases. Conversely, when switching from the first mode to the second mode, the post injection fuel quantity is increased, the primary injection pressure is increased, the boost is increased, and the SOI is retarded.

As shown, the third mode operates when a desired engine temperature is between the lower threshold engine temperature and the upper threshold engine temperature. Additionally or alternatively, other conditions may dictate when the engine operates in the third mode. For example, the third mode may initiate based on CAC condensate, particulate matter output, or any other suitable conditions discussed above with respect to method 200 of FIGS. 2A-D. For a desired engine temperature less than the lower threshold engine temperature, the second mode is used. For a desired engine temperature greater than the upper threshold engine temperature, the first mode is used. The lower threshold engine temperature may change based on engine load. For example, as engine load increases, the lower threshold engine temperature may also increase. Conversely, the upper threshold engine temperature may decrease as engine load increases.

When switching from the third mode to the first mode, the post injection fuel quantity is increased, the pressure of injection is increased, boost is either increased or kept constant, and SOI is retarded. Boost may be either increased or kept substantially constant, when switching from the third mode to the first mode, independent of the coolant temperature. As depicted, as the coolant temperature in the third mode approaches the first mode, boost remains substantially constant. In this way, an adjustment of boost may be independent of the coolant temperature when operating in the first mode (unlike the third mode in which boost adjustments are coolant temperature dependent).

Turning now to FIG. 4, an operating sequence 400 illustrating example engine adjustments for an engine undergoing a range of engine loads is illustrated. Line 402 represents a flow of higher temperature coolant (e.g., hotter coolant) from a higher temperature coolant loop to the CAC, line 404 represents a flow of lower temperature coolant (e.g., cooler coolant) from a lower temperature coolant loop to the CAC, line 406 represents an engine temperature and dashed line 407 represents a desired engine temperature, line 408 represents engine load, dashed line 409 represents a nominal boost and line 410 represents an adjusted boost, line 412 represents a start of injection (SOI), dashed line 413 represents a nominal primary injection pressure and line 414 represents an adjusted primary injection pressure, and line 416 represents a ratio of the hotter coolant to the cooler coolant and dashed line 417 represents an even mixture of hotter coolant and cooler coolant (e.g., 50% hotter coolant and 50% cooler coolant). When dashed line 407 is no longer visible, it may be understood that its value is equal to the value of line 406. A value of zero along the vertical axis indicates that no coolant of the indicated type is flowing to the CAC. The horizontal axes of each plot represent time and time increases from the left side of the figure to the right side of the figure.

The nominal boost may be defined as a boost occurring in an engine without adjustment of the coolant temperature as described herein, such as via a dual coolant circuit as described above. The adjusted boost may therefore be described as an adjustment of the nominal boost in a system comprising a compressor to provide boost and an ability to adjust coolant flow to a CAC (e.g., system 100 of FIG. 1). The nominal primary injection pressure may be defined as an injection occurring in an engine without the dual coolant circuit as described above. The adjusted injection pressure may therefore be described as an adjustment of the nominal primary injection pressure in a system comprising a fuel injector and the dual coolant circuit (e.g., system 100 of FIG. 1).

Prior to t1, the engine load and the engine temperature are relatively low, as shown by lines 406 and 408, respectively. The engine temperature is less than a desired engine temperature, as shown by dotted line 407. As described above, the desired engine temperature may be based on engine load and particulate matter emissions. As a result, the engine enters a first mode (e.g., a heating mode) and flows only the hotter coolant to the CAC, without flowing the cooler coolant to the CAC, as shown by lines 402 and 404 respectively. As a result, the ratio is 1:0 (e.g., hotter coolant: cooler coolant), which means only hotter coolant is flowing to the CAC, as shown by line 416. In order to assist increasing the engine temperature to the desired engine temperature and to compensate for increases in particulate matter emissions due to combusting higher temperature intake air, boost and injection pressure are both relatively low, as shown by lines 410 and 414. However, boost and injection pressure are both greater than the nominal boost and the nominal injection pressure respectively, as shown by lines 409 and 413, in order to increase an engine temperature as described above. As depicted, the nominal boost and nominal injection pressure are altered corresponding to the engine load alteration. For example, the nominal boost and nominal injection pressure increase as the engine load increases. The SOI is retarded in order to further increase a rate of temperature increase of the engine temperature in order to allow the temperature to reach the desired engine temperature.

For example, for an engine undergoing a cold-start, the engine load and engine temperature may be relatively low. In order to rapidly increase the engine temperature, only hotter coolant flows to the CAC upstream of the engine. In this way, air delivered to the engine, from the CAC, may be greater in temperature than if a mixture of hotter and cooler coolants flowed to the CAC or if only cooler coolant flowed to the CAC. By increasing boost and primary injection pressure relative to a nominal boost and injection pressure respectively, the rate of the engine temperature increasing rises to help the engine both reach a desired engine temperature and decrease particulate matter output during the cold-start.

At t1, in response to the engine temperature still not being at the desired engine temperature, only the hotter coolant flows to the CAC without flowing any of the cooler coolant to the CAC. Also at t1, the engine load begins to increase. The boost and primary injection pressure continue to slightly increase and remain greater than the nominal boost and injection pressure respectively, as the engine temperature approaches the desired engine temperature. The SOI remains relatively constant. The ratio is maintained at 1:0.

After t1 and prior to t2, only the hotter coolant continues to flow to the CAC and thus the ratio remains at 1:0, where cooler coolant does not flow to the CAC. The engine temperature continues to approach the desired engine temperature and the difference between the two temperatures begins to decrease. The engine load also continues to increase. As the engine temperature approaches the desired engine temperature, the boost and primary injection pressure continue to increase and remain greater than the nominal boost and injection pressure respectively. The SOI begins to slightly advance in timing (e.g., less retarded).

At t2, the engine temperature is substantially equal to the desired engine temperature. As a result, cooler coolant begins to flow to the CAC. The flow of hotter coolant to the CAC decreases in proportion to the increase in flow of cooler coolant to the CAC. For example, at time t2 the controller may adjust a valve (such as CAC inlet valve 150 shown in FIG. 1), to flow a portion of both hotter coolant and cooler coolant to the CAC and through the CAC cooling tubes. The engine load continues to increase. The boost and injection pressure continue to increase due to the engine load increasing, but a rate of increasing decreases due to the engine temperature being equal to the desired engine temperature. The nominal boost and nominal primary injection pressure increase corresponding to an increase in the engine load. The SOI continues to be less retarded in response to the flow of hotter and cooler coolant to the CAC. In this way, the engine temperature may be maintained near the desired engine temperature. The ratio is greater than the even ratio (e.g., 0.5:0.5) indicating more hotter coolant is flowing to the CAC than cooler coolant, as shown by dashed line 417. As depicted, the flow of cooler coolant is proportional to the engine load while the flow of hotter coolant is inversely proportional to the engine load.

After t2 and prior to t3, the engine load continues to increase. Due to the engine load increase, the engine temperature would likely also increase and surpass the desired engine temperature. Therefore, the controller decreases the ratio (e.g., decreases the flow of hotter coolant and increases the flow of cooler coolant to the CAC via adjusting a coolant valve upstream of the CAC) in response to the engine load increasing. In this way, the engine temperature remains substantially equal to the desired engine temperature despite the increase in engine load. Furthermore, intake air delivered to the engine is cooler than it would be if the vehicle only flowed a higher temperature coolant to the CAC. The ratio is greater than the even ratio (e.g., a greater amount of hotter coolant than cooler coolant flows to the CAC). The nominal boost and nominal injection pressure approach the adjusted boost and adjusted injection pressure, respectively, in order to assist maintaining the engine temperature near the desired engine temperature as the engine load increases. In other words, the adjusted boost and adjusted injection pressure increase at a rate less than a rate of increase of the nominal boost and nominal injection pressure with respect to engine load. The SOI continues to be more advanced in order to further decrease the engine temperature as it would otherwise increase due to increasing engine load.

At t3, the engine load continues to increase. The engine temperature remains substantially equal to the desired engine temperature due to the ratio decreasing. As a result, the flow of cooler coolant to the CAC increases and the flow of hotter coolant to the CAC decreases due to the increasing engine load. Additionally or alternatively, to further maintain the engine temperature in response to the increasing engine load, the nominal boost and nominal injection pressure continue to approach the adjusted boost and adjusted injection pressure, respectively. SOI continues to be more advanced. The ratio remains greater than the even ratio (e.g., more hotter coolant flows to the CAC than cooler coolant).

After t3 and prior to t4, as the engine load continues to increase and approach a relatively high engine load, the flow of cooler coolant to the CAC continues to correspondingly increase to maintain the engine temperature near the desired engine temperature. As a result, the ratio decreases and becomes less than the even ratio (e.g., more cooler coolant flows to the CAC than hotter coolant). The adjusted boost falls below the nominal boost, SOI is more advanced, and the adjusted injection pressure decreases below the nominal injection pressure in order to help cool the engine temperature and keep it substantially equal to the desired engine temperature as the engine load continues to increase. In other words, the adjusted boost may be lower than a nominal boost would have otherwise been without coolant adjustments, as described above. Similarly, the adjusted primary injection may be lower than a nominal primary injection would have otherwise been without coolant adjustments, as described above.

At t4, the engine load continues to increase while engine temperature remains substantially equal to the desired engine temperature due to the ratio decreasing to near 0:1. In order to further maintain the engine temperature to be substantially equal to the desired engine temperature, adjusted boost and adjusted injection pressure continue to increase with engine load but remain below the nominal boost and nominal injection pressure respectively, while the SOI becomes more advanced.

After t4 and prior to t5, the engine load is relatively high. In response, the engine enters the second mode and flows only cooler coolant to the CAC without flowing hotter coolant to the CAC. As a result, the ratio becomes substantially equal to 0:1. The engine temperature remains substantially equal to the desired engine temperature as a result of the engine switching to the second mode. For example, the engine temperature may be higher than the desired engine temperature when engine load is relatively high and both of the hotter coolant and cooler coolant are delivered to the CAC. The adjusted boost and adjusted injection pressure are relatively high, as are the nominal boost and nominal injection pressure, but the adjusted boost and adjusted injection pressure are below the nominal boost and nominal injection pressure, respectively. The SOI is advanced due to a temperature of the intake air being relatively low. As described above, when the intake air temperature is decreased during the second mode, hydrocarbon output may increase. In order to circumvent the increase in hydrocarbon output during the second mode, boost is decreased, injection pressure is decreased, and SOI is advanced.

At t5, the engine load remains relatively high. The ratio is substantially equal to 0:1. Thus, only cooler coolant flows to the CAC without flowing any hotter coolant to the CAC. The engine temperature is substantially equal to the desired engine temperature. The adjusted boost and adjusted injection pressure remain below the nominal boost and nominal injection pressure, respectively, while the SOI is advanced in order to further maintain the engine temperature and decrease hydrocarbon output.

After t5 and prior to t6, the engine load remains relatively high. The ratio is substantially equal to 0:1, therefore only the cooler coolant flows to the CAC (e.g., flow of the cooler coolant is relatively high while the hotter coolant does not flow to the CAC). As a result, the engine temperature remains substantially equal to the desired engine temperature. The adjusted boost and adjusted injection pressure remain less than the nominal boost and nominal injection pressure, respectively, while the SOI is advanced in order to further maintain the engine temperature and decrease hydrocarbon output, as described above.

At t6, the engine load begins to decrease. As a result, the engine temperature may remain substantially equal to the desired engine temperature with less cooling. As a result, the hotter coolant begins to flow to the CAC along with the cooler coolant (e.g., the engine enters the third mode). The ratio begins to increase toward the even ratio, although it remains below the even ratio (e.g., hotter coolant begins to flow to the CAC with the cooler coolant, but the cooler coolant is a majority of a total coolant flow to the CAC). The adjusted boost, adjusted injection pressure, nominal boost, and nominal injection pressure begin to decrease. The adjusted boost and adjusted injection pressure remain below the nominal boost and nominal injection pressure, respectively, while the SOI is advanced in order to decrease hydrocarbon output due to the majority of cooler coolant flowing to the CAC.

After t6 and prior to t7, the engine load continues to decrease to a relatively low load. The ratio becomes greater than the even ratio (e.g., flow of hotter coolant to the CAC is greater than the flow of cooler coolant to the CAC). The flow of hotter coolant to the CAC increases while the flow of cooler coolant toward the CAC decreases in response to the decreasing engine load. As a result, the engine temperature remains substantially equal to the desired engine temperature. The adjusted boost, adjusted injection pressure, nominal boost, and nominal injection pressure continue to decrease. The adjusted boost and adjusted injection pressure become greater than the nominal boost and nominal injection pressure, respectively, and the SOI begins to be slightly more retarded in response to the increasing flow of hotter coolant to CAC and resultant increased intake air temperature.

At t7, the engine load continues to decrease toward a relatively low engine load. The hotter coolant flow to the CAC continues to increase while the cooler coolant flow continues to correspondingly decrease in response to the decreasing engine load. The ratio continues to increase toward 1:0 and is greater than the even ratio. Adjusted boost and adjusted injection pressure continue to decrease and remain greater than the nominal boost and nominal injection pressure, respectively, and the SOI is more retarded and as a result, the engine temperature remains substantially equal to the desired engine temperature.

After t7, the engine load continues to decrease. As a result, the hotter coolant flow to the CAC increases while the cooler coolant flow to the CAC correspondingly decreases. The ratio approaches 1:0. Adjusted boost and adjusted injection pressure continue to decrease and remain greater than the nominal boost and nominal injection pressure, respectively, and the SOI is more retarded and as a result, the engine temperature remains substantially equal to the desired engine temperature.

As shown in FIG. 4, adjustments to the ratio of hotter coolant to cooler coolant delivered to the CAC are made responsive to the current engine temperature and the desired engine temperature. Additionally or alternatively, the ratio may also be adjusted based on alternate engine operating parameters, such as CAC condensate, particulate matter output, and other parameters described above. For example, as a condensate level in the CAC increases, the ratio may be altered such that the flow of hotter coolant increases while the flow of cooler coolant decreases in order to decrease condensate formation in the CAC.

In this way, a CAC may be cooled via a first coolant of a higher, first temperature, a second coolant of a lower, second temperature, where the first temperature is higher than the second temperature, or a mixture of the first and second coolants to achieve a temperature between temperatures of the first coolant and the second coolant. As such, a vehicle may operating in a first mode (e.g., flowing only higher temperature coolant to the CAC), a second mode (e.g., flowing only lower temperature coolant to the CAC) or a third mode (e.g., flowing a combination of the higher temperature coolant and the lower temperature coolant to the CAC). By adjusting coolant flow to the CAC between these three modes, a temperature of intake air delivered to the engine may be more accurately adjusted. As a result, the engine temperature may be more rapidly and accurately adjusted based on engine operating conditions, thereby increasing engine efficiency. Additionally, adjusting the temperature of coolant delivered to the CAC in this way may allow for condensate formation within the CAC to be controlled to a desired level, thereby decreasing engine misfire and/or unstable combustion events. The technical effect of providing a CAC with two coolants, one of a higher temperature and one of a lower temperature, is to increase engine efficiency and decrease emissions during changes to engine operating conditions (e.g., increasing/decreasing load, CAC condensate, etc.). In this way, a desired engine temperature and/or CAC outlet temperature may be achieved more quickly and precisely by flowing a mixture of two different temperature coolants. Further, the technical effect of adjusting engine operating parameters responsive to the adjusting the ratio of higher temperature to lower temperature coolant to the CAC is to decrease particulate matter emissions and/or compensate for changes in hydrocarbon emissions due to the changing intake air temperature. In this way, particulate matter emissions may be reduced and engine efficiency may be further increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    flowing a mixture of coolants including a first coolant at a first temperature and a second coolant at a second temperature, lower than the first temperature, to a charge air cooler;
    adjusting a temperature of the mixture via adjusting a ratio of the first coolant to the second coolant in response to an engine operating condition and an outlet temperature of the charge air cooler; and
    in response to adjusting the temperature of the mixture via adjusting the ratio of the first coolant to the second coolant, adjusting one or more engine operating parameters based on the adjusted ratio of the first coolant to the second coolant,
    wherein adjusting the one or more engine operating parameters includes increasing the ratio of the first coolant to the second coolant while flowing at least a portion of both the first coolant and the second coolant to the charge air cooler, and in response to increasing the ratio of the first coolant to the second coolant while flowing at least the portion of both the first coolant and the second coolant to the charge air cooler, increasing an injection pressure of fuel injected into an engine, increasing boost, increasing an amount of fuel injected into the engine, and retarding injection timing.

2. The method of claim 1, wherein adjusting the temperature of the mixture includes increasing the ratio of the first coolant to the second coolant in response to one or more of decreasing engine load, the outlet temperature of the charge air cooler decreasing below a desired outlet temperature, intake manifold temperature decreasing below a threshold intake manifold temperature, combustion phasing retarding beyond a target timing, decreasing engine temperature, decreasing after-treatment temperature, and increasing condensate formation in the charge air cooler.

3. The method of claim 1, wherein adjusting the temperature of the mixture includes decreasing the ratio of the first coolant to the second coolant in response to one or more of increasing engine load, the outlet temperature of the charge air cooler increasing above a desired outlet temperature, intake manifold temperature increasing above a threshold intake manifold temperature, increasing engine temperature, increasing after-treatment temperature, and decreasing condensate formation in the charge air cooler.

4. The method of claim 1, wherein adjusting the temperature of the mixture includes adjusting the ratio of the first coolant to the second coolant so only the first coolant and not the second coolant flows to the charge air cooler in response to one or more of engine load below a threshold load, a catalyst not being lit-off, engine temperature below a threshold temperature, intake manifold temperature decreasing below a threshold intake manifold temperature, combustion phasing retarding beyond a threshold timing, and condensate formation within the charge air cooler increasing above a threshold condensate level.

5. The method of claim 1, wherein adjusting the temperature of the mixture includes adjusting the ratio of the first coolant to the second coolant so only the second coolant and not the first coolant flows to the charge air cooler in response to one or more of engine load above a threshold load, an intake air flow rate or amount flowing to the engine dropping below a threshold value, and engine knock.

6. The method of claim 1, further comprising adjusting the ratio of the first coolant to the second coolant so only the first coolant flows to the charge air cooler, wherein, in response to adjusting the ratio of the first coolant to the second coolant so only the first coolant flows to the charge air cooler, adjusting the one or more engine operating parameters includes one or more of: increasing the injection pressure of fuel injected into the engine, retarding injection timing, increasing post-injection fuel quantity, bypassing at least a portion of EGR around an EGR cooler, and increasing boost.

7. The method of claim 1, further comprising adjusting the ratio of the first coolant to the second coolant so only the second coolant flows to the charge air coolant, wherein, in response to adjusting the ratio of the first coolant to the second coolant so only the second coolant flows to the charge air cooler, adjusting the one or more engine operating parameters includes one or more of: decreasing boost, advancing injection timing, decreasing post-injection fuel quantity, flowing all of an exhaust gas in an EGR pathway through an EGR cooler, and decreasing the injection pressure of fuel injected into the engine.

8. The method of claim 1, wherein the charge air cooler is positioned in an engine intake passage downstream of a compressor and upstream of an intake manifold of the engine, wherein the first coolant is coolant from a first cooling circuit and the second coolant is coolant from a second cooling circuit, fluidly separate from the first cooling circuit.

9. A method for an engine, comprising:
  operating the engine in a first operating mode, where the first operating mode includes flowing a first temperature coolant and not a second temperature coolant to a charge air cooler (CAC), where the second temperature coolant is cooler than the first temperature coolant;
  transitioning the engine from operating in the first operating mode to operating in a third operating mode, where a mixture of the first temperature coolant and the second temperature coolant is flowed to the CAC during the third operating mode; and
  advancing a start of injection (SOI) responsive to the transition of the engine from operating in the first operating mode to operating in the third operating mode.

10. The method of claim 9, wherein the first operating mode includes one or more of engine load below a first threshold load, a catalyst not being lit-off at engine start-up, intake manifold temperature decreasing below a threshold intake manifold temperature, combustion phasing being retarded beyond a target timing, engine temperature below a lower, first threshold temperature, and a condensate level in the CAC increasing above a threshold condensate level.

11. The method of claim 10, further comprising operating the engine in a second operating mode, transitioning from operating the engine in the second operating mode to operating the engine in the third operating mode, and retarding the SOI responsive to the transition of the engine from operating in the second operating mode to operating in the third operating mode,
  where operating the engine in the second operating mode includes flowing the second temperature coolant and not the first temperature coolant to the CAC during the second operating mode, and wherein the engine is operated in the second operating mode during one or more conditions of engine load above a second threshold load, engine knock, intake air flow to the engine dropping below a threshold value, and engine temperature above a higher, second threshold temperature.

12. The method of claim 11, wherein the third operating mode includes engine load between the first threshold load and the second threshold load, engine temperature between the first threshold temperature and the second threshold temperature, intake manifold temperature substantially equal to the threshold intake manifold temperature, combustion phasing substantially equal to the target timing, intake air flow substantially equal to the threshold value, the condensate level in the CAC below the threshold condensate level, engine knock below a threshold knock level, and the catalyst being lit-off.

13. The method of claim 9, further comprising, in response to flowing the first temperature coolant and not the second temperature coolant to the CAC during the first operating mode, adjusting boost independent of CAC coolant temperature, adjusting a post fuel injection amount as a function of CAC coolant temperature, adjusting a primary injection pressure of fuel injected into the engine as a function of CAC coolant temperature, and adjusting an injection timing as a function of CAC coolant temperature.

14. The method of claim 9, further comprising, in response to flowing the second temperature coolant and not the first temperature coolant to the CAC during the second operating mode, adjusting boost, a post fuel injection amount, a primary injection pressure of fuel injected into the engine, and as a function of coolant temperature.

15. The method of claim 9, further comprising, in response to flowing the mixture to the CAC during the third operating mode, increasing one or more of: boost, post fuel injection amount, primary fuel injection pressure, and an amount of injection timing retard, as a coolant temperature of coolant delivered to the CAC increases.

16. A system, comprising:
  a first coolant loop circulating a first coolant;
  a second coolant loop circulating a second coolant, where a temperature of the first coolant is higher than the second coolant;
  a charge air cooler fluidly coupled to both the first coolant loop and the second coolant loop via a coolant valve; and
  a controller with computer-readable instructions for:
    selectively adjusting the coolant valve into each of a first position to flow only the first coolant to the charge air cooler, a second position to flow only the second coolant to the charge air cooler, and a third position to flow a mixture of the first and second coolants to the charge air cooler based on engine operating conditions, wherein the controller includes further computer-readable instructions for advancing a start of injection (SOI) responsive to transitioning a position of the coolant valve from the first position to the third position.

17. The system of claim 16, wherein the controller includes further computer-readable instructions for further adjusting an engine operating parameter based on a previous engine operation.

18. The system of claim 17, wherein the controller includes further computer-readable instructions for further adjusting the engine operating parameter based on a temperature of coolant flowing through the charge air cooler, where the temperature of coolant flowing through the charge air cooler is based on the position of the coolant valve and a ratio of the first coolant to the second coolant flowing through the charge air cooler.

* * * * *